United States Patent

Teixido

[11] Patent Number: 5,833,910
[45] Date of Patent: Nov. 10, 1998

[54] MOLD AND METHOD FOR MANUFACTURING CONDUIT GROMMET ELEMENTS

[75] Inventor: Miguel Jorda Teixido, Valls, Spain

[73] Assignee: Mecanismos Auxiliares Industiales S.A., Valls(Tarragona), Sweden

[21] Appl. No.: 538,582

[22] Filed: Oct. 3, 1995

[51] Int. Cl.$^6$ .................................................. B29C 45/14
[52] U.S. Cl. .................... 264/277; 264/1.25; 264/271.1; 264/279; 425/116; 425/123
[58] Field of Search ................ 264/1.25, 271.1, 264/277, 279; 425/116, 123

[56] References Cited

U.S. PATENT DOCUMENTS

| 4,419,156 | 12/1983 | Diaz et al. ................................. 156/49 |
| 5,560,882 | 10/1996 | Daguet et al. .......................... 264/265 |

FOREIGN PATENT DOCUMENTS

| 85 09989 | 3/1986 | European Pat. Off. . |
| 0 179 657 | 4/1986 | European Pat. Off. . |
| 4017077 | 11/1991 | Germany . |

Primary Examiner—David W. Wu
Attorney, Agent, or Firm—Jacobson, Price, Holman & Stern, PLLC

[57] ABSTRACT

A method for forming a grommet element including two successive steps which are performed on an assembly of conduits, such as cables or wires. The first step consists of sealing the conduit assembly under pressure, while the second step involves molding PVC or another thermoplastic elastomer over the sealed structure to form the grommet. A mold is also provided for carrying out the method. The mold includes a stationary portion and an axially movable portion. Preferably, the method includes at least one of the following operations or steps: (a) Installing respective connecting terminals on the conduits; (b) Forming a conduit assembly from a plurality of individual conduits, and banding together two proximal points of the conduit assembly; (c) Introducing the conduit assembly into the lower part of a mold; (d) Closing the mold; (e) Moving the two aforementioned proximal points closer together to produce flexural buckling of the conduits in the conduit assembly; (f) Introducing an adhesive mass into the mold, under pressure, at an elevated temperature, during a predetermined period of time; (g) Injecting the hot adhesive between the conduits of the conduit assembly; (h) Cooling the mold to solidify the adhesive; and (i) Molding PVC or another thermoplastic elastomer over the adhesive-sealed conduit assembly, to form a grommet element, and joining the thus sealed conduit assembly to a flange or dividing wall.

8 Claims, 1 Drawing Sheet

MOLD AND METHOD FOR MANUFACTURING CONDUIT GROMMET ELEMENTS

BACKGROUND OF THE INVENTION

The present invention relates to a method and mold for manufacturing grommet elements for conduits, such as cables or wires. The present invention accomplishes the objects of the invention with maximum safety and effectiveness.

On the market, there are several state-of-the-art grommet elements for enabling the passage of an assembly of cables or wires (more than 20) from one compartment to another. Examples of such grommet elements can be found in the dividing wall which separates an automobile's engine compartment from the passenger compartment. When the grommet element is fixed to an opening in the dividing wall through which the cables or wires pass, a total seal against water, gas, or noise is desired.

SUMMARY OF THE INVENTION

An object of the present invention is to completely seal an assembly of conduits against water, gases, and noise.

Another object of the present invention is to isolate the assembly of conduits from a dividing wall through which the conduit assembly passes.

Yet another object of the present invention is to seal the combination of a wire assembly and a grommet, against water, gases, and noise.

Still another object of the present invention is to provide sturdy flange means for rigidly fixing the conduit assembly to a dividing wall.

Another object of the present invention is to provide a seal between the grommet and a dividing wall through which the grommet passes.

Yet another object of the present invention is to provide at least one member for prefixing the grommet to the dividing wall to facilitate screwing of fastening screws.

Still another object of the present invention is to provide a plastic flange which facilitates utilization of fastening screws.

Another object of the present invention is to seat or receive the fastening screws so as to facilitate their use without the need for a conventional joint having plates on opposite sides of the dividing wall.

Yet another object of the present invention is to provide acoustic insulation.

Still another object of the present invention is to provide a surrounding disk for the grommet, which covers the hole through the dividing wall and facilitates mounting of the grommet from either side of the dividing wall.

Another object of the present invention is to provide flanges, in numbers and locations which depend on the thickness of the dividing wall and the desired mounting location.

According to the present invention, a method of forming a grommet element includes two successive steps which are performed on an assembly of conduits. The first step consists of sealing the conduit assembly under pressure, while the second step involves molding PVC or another thermoplastic elastomer over the sealed structure to form the grommet. Preferably, the PVC or other thermoplastic material has similar characteristics to the insulation surrounding the individual conduits of the conduit assembly. A mold is also provided for carrying out the inventive method.

The inventive method includes at least one of the following operations or steps:

(a) Installing respective connecting terminals on the conduits.

(b) Forming a conduit assembly from a plurality of conduits, and banding together two proximal points of the conduit assembly.

(c) Introducing the conduit assembly into the lower part of a mold.

(d) Closing the mold.

(e) Moving the two aforementioned proximal points closer together, by pneumatically driven or hydraulically driven mechanical means, to produce flexural buckling of the conduits in the conduit assembly.

(f) Introducing an adhesive mass into the mold, under pressure, at an elevated temperature, during a predetermined period of time.

(g) Injecting the hot adhesive between the conduits of the conduit assembly.

(h) Cooling the mold to solidify the adhesive.

(i) Molding PVC or another thermoplastic elastomer over the adhesive-sealed conduit assembly, to form a grommet element pursuant to one's needs, and joining the thus sealed conduit assembly to a flange and/or dividing wall.

Although there is no known art which anticipates the method of the present invention, a related method is described in German Patent 4,017,077 to Robert Bosch GmbH wherein the molding step (i) above is carried out on a particular element and for a small number of cables. Other analogous processes are described in European Patent No. 179,657 to Raychem GmbH, and French Patent No. 8509989 to the Lisa Dräxlmeier firm.

Further details and characteristics of the present invention will become apparent from the following description with reference to the accompanying drawings which schematically illustrate preferred features of the invention. It is noted, however, that the description and drawings are merely illustrative examples of possible practical embodiments, and are in no way limiting nor should they be deemed to be limiting.

DESCRIPTION OF THE PREFERRED EMBODIMENTS

The preferred embodiments of the present invention will now be described with reference to the drawings. Throughout this disclosure, the axial direction is defined by the longitudinal axis of the conduits when properly inserted in the mold of the present invention, while the radial direction is understood to be perpendicular to the axial direction.

Figure 1:
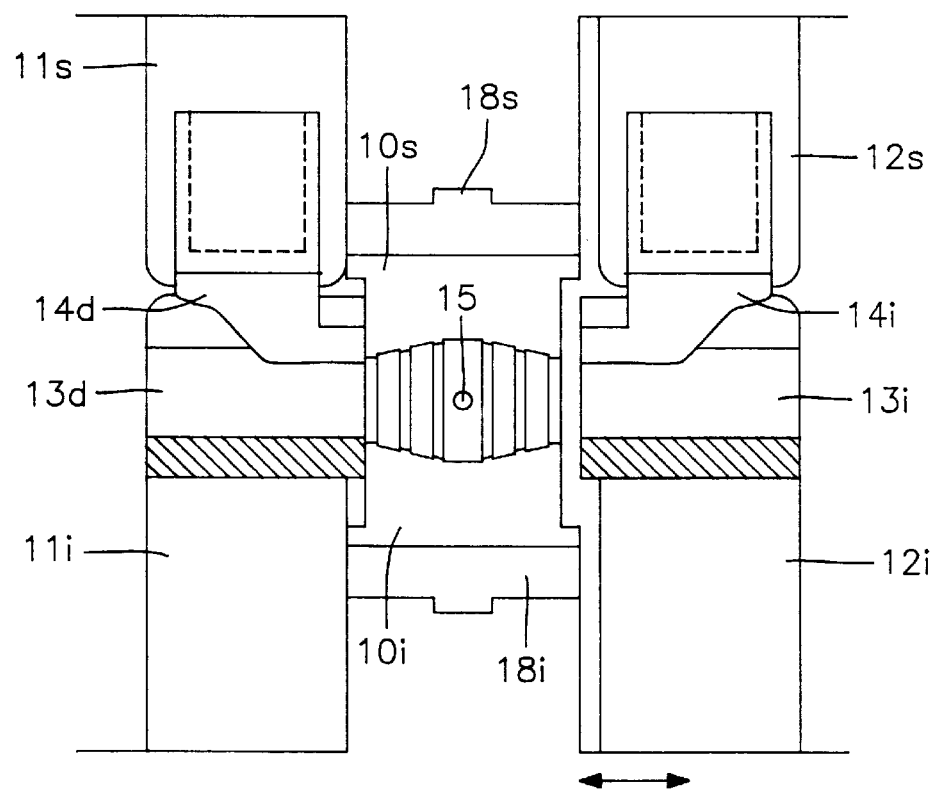
FIG. 1 is a front (elevation) view, in partial cross section, of a mold, closed and without conduits, in accordance with the present invention.
Figure 2:
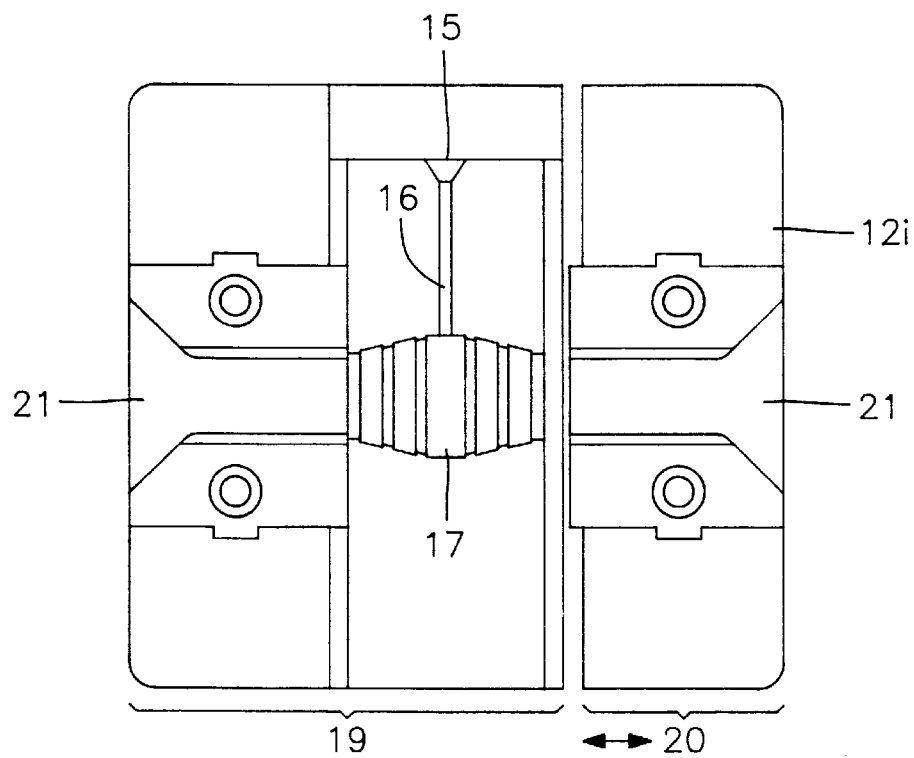
FIG. 2 is a top (plan) view of a lower part of the mold.

With reference to FIGS. 1 and 2, a preferred embodiment of the present invention includes: a mold 10 having a radially movable upper half (or section) 10s and a stationary lower half (or section) 10i; a radially movable upper-left conduit seal support 11s; a stationary lower-left conduit seal support 11i; an axially movable and radially movable upper-right conduit seal support 12s; an axially movable and radially stationary lower-right conduit seal support 12i; a stationary lower-left conduit seal 13d; an axially movable and radially stationary lower-right conduit seal 13i; a radially movable and axially stationary upper-left conduit seal 14d; a radially movable and axially movable upper-right conduit seal 14i; an entrance 15 for hot adhesive; a channel 16; a mold cavity 17; an upper cooling circuit plate 18s; a lower cooling circuit plate 18i; and a conduit or guide channel 21 for accommodating a conduit assembly. The foregoing elements are arranged so as to form a stationary portion 19 and an axially movable portion 20.

According to one of the preferred embodiments of the present invention, the mold 10 is mounted onto an injection molding machine. The movable upper half 10s of the mold 10 is lowered onto and raised up from the stationary lower half 10i in precisely controlled radial movements, preferably vertical movements. The movable upper half 10s of the mold 10 is held between the left and right upper conduit seal supports 11s and 12s, which, in turn, support the left and right upper conduit seals 14d and 14i.

The stationary lower mold half 10i includes the left and right lower conduit seals 13d and 13i, which, in turn, are respectively supported by the left and right lower conduit seal supports 11i and 12i.

As shown in FIG. 2, the guide channel 21 traverses the lower mold half 10i along the axial direction and serves as a passage way for the conduit assembly along a central part of the lower mold half 10i. A grommet element produced in accordance with the present invention is formed on the conduit assembly.

The mold cavity 17 in the central part of the mold 10 is cooled by cooling plates 18s, 18i which, in turn, are connected to a cooling circuit as is generally known. Such cooling prevents damage to the conduit insulation at the time of introduction of the hot adhesive into the interior of the cavity 17 (through the entrance 15 and channel 16). The cooling thereafter facilitates setting of the adhesive. The configuration of the chamber 17 depends primarily on the desired shape of the grommet element to be produced.

Preferably, the mold 10 is contained in a machine which executes the opening, closing, and axial compression movements of the axially movable portion 20 with respect to the stationary portion 19.

A method in accordance with the present invention begins by mounting suitable terminals on the ends of the individual conduits. Next, the conduits are aligned and banded together at two proximal points to thus create an assembly of conduits.

The assembly of conduits is manually introduced into the guide channel 21 located in the lower conduit seals 13d, 13i. The upper mold half 10s is then lowered, thereby fixing the two proximal points of the conduit assembly by means of the clamping action of the conduit seal pairs 13i,13d,14i, 14d.

While the two proximal points remain fixed between the respective conduit seals 13i,13d,14i,14d, the axially movable portion 20 of the mold 10 is advanced toward the stationary portion 19 (toward the left side of FIG. 2). Such advancing of the axially movable portion 20 causes flexural buckling of the individual conduits of the conduit assembly in the interior of the chamber 17, whereby the conduits separate from one another.

Next, the adhesive mass is introduced via entrance 15 and channel 16, preferably at a temperature between 130° C. and 250° C., and with a pressure between 20 kg/cm.$^2$ and 70 kg/cm.$^2$ The preferred temperature of the adhesive mass is approximately 200° C., and the preferred pressure is approximately 40 kg/cm$^2$.

The adhesive flows into the spaces which exist between the conduits and fills the remaining volume of the mold cavity 17. The adhesive then cools and sets to create a solid body (or structure) which provides a complete seal.

Preferably, a final step of the method involves the production of a molded body over the sealed conduit assembly. The molded body provides the external configuration of the grommet in accordance with the shape and dimensions of the opening in the dividing wall through which the grommet will pass, and so as to provide a desired sealing effect.

The shape and dimensions of the mold cavity 17 depend on the given applications, and depend on the number and diameters of the conduits.

It will be understood from the drawings and description thereof, that the invention provides a simple and effective design which is easy to implement in practice and is unquestionably a useful and novel technical solution.

Given the foregoing description of the invention with reference to the accompanying drawings, it will be appreciated that various apt modifications of details and features may be introduced without departing from the scope and spirit of the invention as set forth in the appended claims.

I claim:

1. A method for manufacturing a conduit grommet containing a conduit assembly consisting of a plurality of individual conduits, and having a positioning and fixation elements for securing the conduit grommet to a dividing wall, said method comprising the steps of:

moving two proximal points of the conduit assembly closer together to produce a slight bowing of the plurality of conduits of the conduit assembly to increase the area between adjacent conduits of the conduit assembly;

sealing the conduit assembly under pressure by injecting a hot adhesive between the plurality of conduits of the conduit assembly while said conduit assembly is contained in a mold having two separable mold sections, to produce a sealed conduit assembly, one of said two mold sections including a stationary part, a radially movable and axially stationary part and a radially movable part, and the other of said two mold sections including an axially movable part, an axially movable and radially stationary part and an axially and radially movable part; and molding PVC or other thermoplastic elastomers over the sealed conduit assembly, to form a grommet element;

said moving of the two proximal points of the conduit assembly closer together to produce slight bowing of the plurality of conduits of the conduit assembly includes axially moving said other mold section of the mold toward said one mold section of the mold.

2. The method for manufacturing a conduit grommet according to claim 1, wherein the adhesive mass is introduced into said mold with a pressure between 20 kg/cm.$^2$ and 70 kg/cm$^2$.

3. The method for manufacturing a conduit grommet according to claim 1, wherein the adhesive mass is introduced into said mold with a temperature between 130° C. and 250° C.

4. The method for manufacturing a conduit grommet according to claim 1, wherein said step of moving the two proximal points of the conduit assembly closer together to produce the slight bowing of the plurality of conduits of the conduit assembly is performed using pneumatically or hydraulically driven mechanical means.

5. A method for manufacturing a conduit grommet containing a conduit assembly consisting of a plurality of individual conduits, and having positioning and fixation elements for securing the conduit grommet to a dividing wall, said method comprising the steps of:

mounting respective connecting terminals to distal ends of said plurality of conduits;

gathering and banding together two proximal points of said plurality of conduits to form said conduit assembly;

introducing the conduit assembly into a mold having two mold sections formed of an axially stationary mold section and an axially movable mold section, and each of said two mold sections having a radially stationary lower part and a radially movable upper part;

closing the mold by bringing said radially movable upper part of said two mold sections together with said radially stationary lower part of said two mold sections;

moving the two proximal points of the conduit assembly closer together by axially moving said axially movable mold section toward said axially stationary mold section to produce a slight bowing of the conduit assembly to increase the area between adjacent conduits of the conduit assembly;

injecting an adhesive mass into the mold between the plurality of conduits, under pressure and at an elevated temperature, during a predetermined period of time;

cooling the mold to effect solidification of the adhesive mass and produce an adhesively bonded conduit assembly; and molding PVC or other thermoplastic elastomers over the adhesively bonded conduit assembly, to form a grommet element.

6. The method for manufacturing a conduit grommet according to claim 5, wherein the adhesive mass is introduced into said mold with a pressure between 20 kg/cm.$^2$ and 70 kg/cm$^2$.

7. The method for manufacturing a conduit grommet according to claim 5, wherein the adhesive mass is introduced into said mold with a temperature between 130° and 250° C.

8. The method for manufacturing a conduit grommet according to claim 5, wherein said step of moving the two proximal points of the conduit assembly closer together to produce flexural buckling of the plurality of conduits of the conduit assembly is performed using pneumatically or hydraulically driven mechanical means.

* * * * *